United States Patent [19]

Lake

[11] Patent Number: 4,782,388
[45] Date of Patent: Nov. 1, 1988

[54] METHOD AND APPARATUS FOR PROVIDING VIDEO MOSAIC EFFECTS

[75] Inventor: David E. Lake, Penn Valley, Calif.

[73] Assignee: The Grass Valley Group, Inc., Grass Valley, Calif.

[21] Appl. No.: 923,771

[22] Filed: Oct. 24, 1986

[51] Int. Cl.$^4$ .............................................. H04N 5/14
[52] U.S. Cl. ...................................... 358/160; 358/22
[58] Field of Search ............... 358/22, 140, 160, 21 R, 358/185, 183, 181, 138, 180, 339; 382/44, 47, 41; 364/521

[56] References Cited

U.S. PATENT DOCUMENTS

| | | | |
|---|---|---|---|
| 4,134,128 | 1/1979 | Hurst | 358/22 |
| 4,496,974 | 1/1985 | Heitmann | 358/140 |
| 4,661,987 | 4/1987 | Anderson et al. | 382/44 |

FOREIGN PATENT DOCUMENTS

| | | | |
|---|---|---|---|
| 0061870 | 5/1981 | Japan | 358/183 |
| 0014678 | 1/1983 | Japan | 358/339 |

OTHER PUBLICATIONS

"Dictionary of Electronics" by the Tandy Corporation p. 508, 1974–75 edition.
"Digital Image Processing", by Gregory A. Baxes, Prentice-Hall Inc., 1984 pp. 23–27 and 160–161.

Primary Examiner—James J. Groody
Assistant Examiner—David E. Harvey
Attorney, Agent, or Firm—Francis I. Gray; John Smith-Hill

[57] ABSTRACT

A video signal is used to create a mosaic effect by carrying out a first sample and hold operation on the video signal so as to generate a second video signal, rotating the effective scanning direction of the second video signal through a predetermined angle to generate a third video signal, and carrying out a second sample and hold operation on the third video signal so as to generate a fourth video signal.

9 Claims, 1 Drawing Sheet

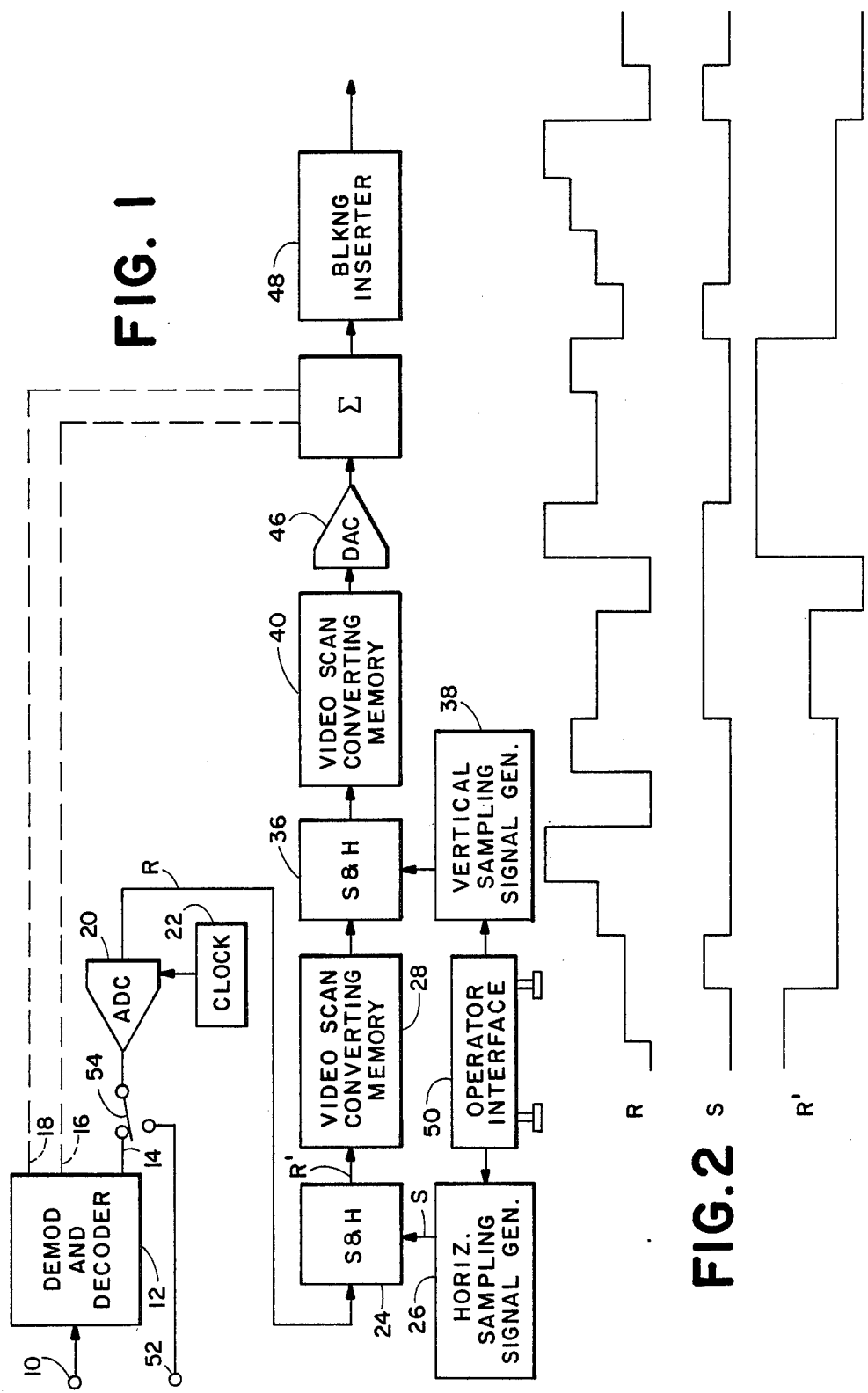

METHOD AND APPARATUS FOR PROVIDING VIDEO MOSAIC EFFECTS

This invention relates to method and apparatus for providing video mosaic effects.

BACKGROUND OF THE INVENTION

A video mosaic effect is created using a conventional digital video effects system by compressing the size of the image represented by an input video signal, thereby reducing its resolution, then progressively expanding the reduced-resolution image until a desired size is attained. At that point, the expanded, reduced-resolution image is replicated over the output scene, whereby the output scene is composed of multiple rectangular mosaic tiles. The nature of the mosaic effect is limited because the mosaic tiles are all identical.

SUMMARY OF THE INVENTION

In a preferred embodiment of the present invention, an input video signal is used to create a video mosaic effect by carrying out a first sample and hold operation on the video signal so as to generate a second video signal, rotating the effective scanning direction of the second video signal through a predetermined angle to generate a third video signal, and carrying out a sample and hold operation on the third video signal so as to generate a fourth video signal.

BRIEF DESCRIPTION OF THE DRAWINGS

For a better understanding of the invention, and to show how the same may be carried into effect, reference will now be made, by way of example, to the accompanying drawings, in which FIG. 1 is a block diagram of apparatus embodying the present invention, and FIG. 2 is a set of waveforms illustrating operation of the FIG. 1 apparatus.

DETAILED DESCRIPTION

The apparatus illustrated in FIG. 1 has an input terminal 10 at which it receives an encoded composite analog video signal in conventional 2:1 interlaced format, consisting of a succession of horizontal scanning intervals each having a duration of 63.5 μs. The start of each field of the interlaced signal is occupied by a vertical blanking interval. Outside of the vertical blanking interval, each horizontal scanning interval is made up of horizontal blanking interval and an active picture interval. The duration of the active picture interval is about 53 μs.

The encoded composite analog video signal is applied to a demodulator and decoder 12, whereby it is converted into component, e.g. R, G, B, form. Although the demodulator and decoder 12 has three outputs 14, 16 and 18 for the three component signals respectively, the processing of only one output signal is described below because the three output signals are treated identically in the blocks that are downstream of the filter 12.

The component signal, e.g. the R component signal, provided at the output 14 of the filter 12 is applied to an analog-to-digital converter (ADC) 20 whereby it is converted to digital form under control of a sampling clock generator 22 and undergoes additional processing so that synchronization information present in the input video signal is omitted from the digital component signal. The synchronization information present in the blanking intervals of the input video signal is preserved, however, through the timing of the processing in the FIG. 1 apparatus and is reinserted when the digital component signals are converted back to analog encoded form. The digital component signal leaving the ADC 20 comprises a stream of eight-bit parallel data words. The digital data words occur in a succession of time slots corresponding to the active picture intervals of the consecutive lines of the composite analog video signal. Each time slot contains 720 data words at a 13.5 MHz data rate. Waveform R in FIG. 2 illustrates in simplified manner the nature of the output signal of the ADC 20. Thus, the output signal has one of several discrete levels (including zero) which it assumes following successive clock transitions.

The digital component signal is applied to a sample and hold circuit 24 which receives a sampling signal from a horizontal sampling signal generator 26. The sample and hold circuit is a parallel in, parallel out register that passes the digital words provided by the ADC 20 so long as the output of the horizontal sampling signal generator 26 is high, and when the output of the sampling signal generator 26 goes low the immediately preceding digital word is held in the register and is repeatedly provided at the output of the register until the sampling signal goes high again. Normally, the sampling signal is a pulse-form signal that is synchronous with the input video signal, and several sample intervals (sampling signal low) will occur during each active picture interval. The duration of each sample interval can be varied without varying the duration of the other sample intervals in like manner. Thus, while all the sample intervals during a given active picture interval might be of the same duration, they might equally all be of different durations, varying in essentially random fashion during the active picture interval. Generally, the transition times of the sampling signal will be uniform form line to line during a frame, but this is not essential, and they may be adjusted from line to line, e.g. during the horizontal blanking intervals. The durations of the sample intervals depend on signals received by the sampling pulse generator from an operator interface 50.

The output signal of the sample and hold 24 is a horizontally-scanned, sampled digital component signal. Waveform S in FIG. 2 illustrates the sampling signal, and waveform R' illustrates the sampled signal provided at the output of the sample and hold 24 in response to the waveforms R and S. The effect of the sample and hold 24 can be seen from a comparison of the waveform R' with the waveforms R and S.

The illustrated apparatus also comprises a video scan converting memory 28, which may be regarded as comprising a rectangular array of storage locations, the number of storage locations in the horizontal direction being equal to the number of digital words that occur during the active picture interval of each horizontal scanning line (720) and the number of locations in the vertical direction being equal to the number of unblanked horizontal lines in each frame (486). The output signal of the sample and hold 24 is written into the memory 28, filling the successive locations in a given horizontal row and filling the rows sequentially. Once an entire frame has been stored, the contents of the memory 28 are read out. However, the words are read out of the memory 28 in column-by-column order, not line-by-line. The effect is that the sampled digital component signal provided by the sample and hold 24 is converted from a horizontally scanned signal to a vertically-scanned signal, and the sampling is suppressed. The output signal of the memory 28 is a stream of eight-bit parallel data words. The digital words occur in a succession of time slots corresponding to the columns of the memory 28. Each time slot contains 486 data words at a 13.5 MHz data rate.

The output signal of the memory 28 is applied to a second sample and hold 36. The sample and hold 36 receives a sampling signal from a vertical sampling signal generator 38 and operates in a similar manner to the sample and hold 24. The sampling signal provided by the vertical sampling signal generator 38 is normally a pulse-form signal that is synchronous with the column-by-column read-out of the digital component signal from the memory 28. In this manner, the digital component signal generated by the ADC 20 undergoes two-dimensional sampling. The output signal of the sample and hold 36 is applied to a second scan converting memory 40 which is similar to the memory 28 but operates in the reverse fashion, i.e., the signal is written into the memory 40 column-by-column, and is read out line-by-line. The output signal of the memory 40 is converted to analog form by a digital-to-analog converter (DAC) 46, and the resulting analog component signal is recombined with the analog component signal provided at the outputs 16 and 18 of the demodulator and decoder 12, which have undergone corresponding processing. Vertical and horizontal blanking intervals are inserted into the combined signal by a blanking inserter 48. The output signal of the blanking inserter is a composite analog video signal in the same format as the signal applied to the terminal 10 but in which the scene has been sampled both horizontally and vertically so as to generate a mosaic pattern. The tiles of the mosaic pattern are rectangular, and the aspect ratio of a tile depends on the ratio of the sample intervals for which samples are held by the sample and holds 24 and 36 respectively. If the samples are held for uniform intervals by both sample and holds, the mosaic tiles are all of the same size and aspect ratio, but if the samples are held for non-uniform intervals by either sample and hold, mosaic tiles of non-uniform size and aspect ratio may be produced.

In a practical implementation of the invention, the first transition from high to low of the signal provided by the horizontal sampling pulse generator 26 always occurs at the start of a line of the video signal. If the subsequent high-low transitions occur at uniform intervals through the active line time, but the duration of these intervals is not an integral submultiple of 720 clock periods (there being 720 clock periods in each line) the result would be a narrow tile at the right side of the picture. This is not esthetically pleasing, and therefore the sampling pulse generator 26 is designed to center the sample intervals of uniform duration within the active line time and provide narrow tiles of equal width at the left and right sides of the picture. The result is a more esthetically pleasing picture.

Each of the scan converting memories is able to store two fields, so that each field in the output signal from the memory 40 is derived from the corresponding field of the input signal. On alternate field, the word held by the sample and hold 30 in response to a high/low transition in the vertical sampling signal represents pixels in different lines of the input video signal. If this transition is at a boundary between two differently-colored areas of the input scene, the color of the resulting mosaic tile will flicker between the two colors that exist on opposite respective sides of the boundary. This effect is disturbing unless the tile is quite small. In order to alleviate this problem, the operator interface provides a signal representing the size of the tiles or if the tiles are of different sizes, the size of the largest tile, to the controller (not shown), and when the size represented by this signal attains a selected value, as determined by the controller, the controller causes both fields of the output signal of the memory 28 to be generated from the same input field.

It will be appreciated that the present invention is not restricted to the particular embodiment that has been described, and that variations may be made therein without departing from the scope of the invention as defined in the appended claims and equivalents thereof. For example, it is not essential that the output of the ADC 20 be applied directly to the sample and hold 24, or that the output of the memory 40 be applied directly to the DAC 46, since other special effects may be imposed on the video signal either before or after the mosaic effect. The invention is not restricted to the component signals being provided by the demodulator and decoder 12, and they may be derived from other sources, as indicated by an auxiliary input terminal 52 connected to a switch 54 in the signal path to the ADC 20. The component signals need not be R, G, B components, but they may be, e.g., Y, I, Q components instead. In a preferred implementation of the invention, the memory 40 is the transform memory of a reverse transform system. The invention is not restricted to implementation in the digital domain, since it may also be implemented at least partially in the analog domain.

I claim:

1. A method of processing a raster scan input video signal, the input video signal being a stream of digital data words occurring at a uniform clock rate, comprising the steps of:
    (a) carrying out a sample and hold operation on the stream of digital data words by receiving each digital data word, and outputting the received digital data word when a first sample signal is in a first state and outputting the digital data word received just prior to the transition of the first sample signal to a second state so long as the first sample signal is in the second state, the number of periods of the clock rate for which the first sample signal is in the second state being variable so as to generate a second video signal having a stream of digital data words;
    (b) rotating the effective scanning direction of the second video signal through a predetermined angle so as to generate a third video signal having a stream of digital data words; and
    (c) carrying out a sample and hold operation on the third video signal as in step (a) using a second sample signal so as to generate a fourth video signal having a stream of digital data words.

2. A method according to claim 1, wherein step (b) is accomplished by writing the stream of digital data words of the second video signal line-by-line into a random access memory row-by-row and reading the digital data words from the random access memory in column-by-column sequence such that the effective scanning direction of the second video signal is rotated through 90 degrees.

3. A method according to claim 1, further comprising the step of:

(d) rotating the effective scanning direction of the forth video signal through a predetermined angle so as to generate a fifth video signal having a stream of digital data words.

4. A method according to claim 3 wherein step (d) comprises the steps of:
writing the stream of digital data words of the fourth video signal into a random access memory in column-by-column sequence; and
reading the digital data words from the random access memory row-by-row to generate the fifth video signal in line-by-line sequence.

5. Apparatus for processing a raster scan input video signal, the input video signal being a stream of digital words occurring at a uniform clock rate comprising:
a first sample and hold for receiving the stream of digital words, and outputting the received digital words when in a first state and outputting the digital word received just prior to transition to a second state while in the second state, the first sample and hold being placed in the first or second state in dependence upon a first sampling signal provided by a sampling signal generator so as to generate a second video signal having a stream of digital words;
means for rotating the effective scanning direction of the second video signal through a predetermined angle so as to generate a third video signal having a stream of digital words; and
a second sample and hold for sampling the third video signal as in the first sample and hold in dependence upon a second sampling signal provided by the sampling signal generator so as to generate a fourth video signal having a stream of digital words.

6. Apparatus according to claim 5, wherein the rotating means comprises:
a random access memory;
means for writing the steam of digital words of the second video signal line-by-line into the random access memory row-by-row; and
means for reading the digital words from the random access memory in column-by-column sequence to produce the third video signal.

7. Apparatus according to claim 5, wherein the sampling signal generator is operative to allow the number of periods of the clock rate for which the second state is held to be variable.

8. Apparatus according to claim 5 further comprising means for rotating the effective scanning direction of the fourth video signal through a predetermined angle so as to generate a fifth video signal having a stream of digital words.

9. Apparatus according to claim 8, wherein the fourth video signal rotating means comprises:
a random access memory;
means for writing the stream of digital words of the fourth video signal into the random access memory in column-by-column sequence; and
means for reading the digital words from the random access memory in row-by-row sequence to produce the fifth video signal in line-by-line format.

* * * * *